Figure 1:
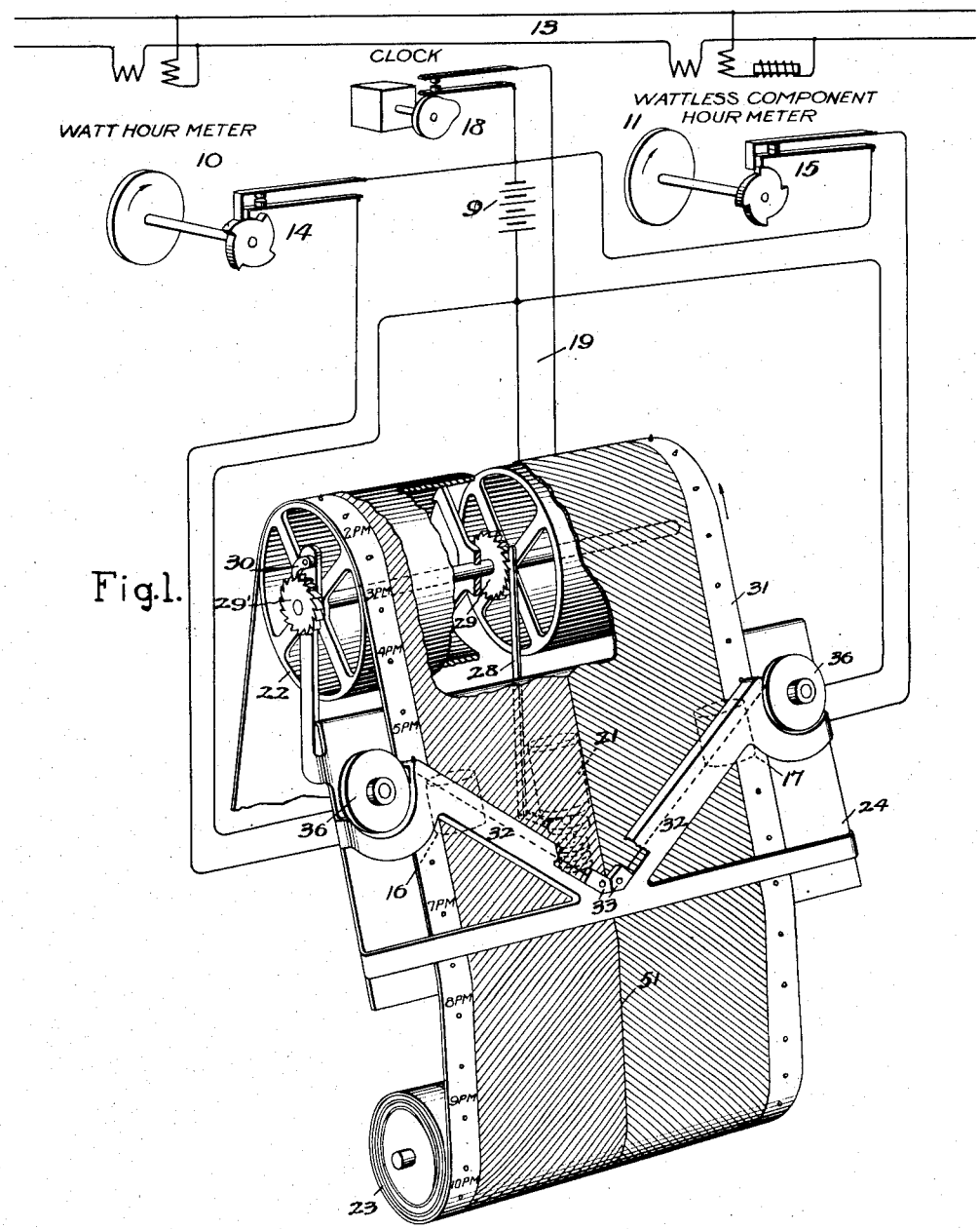

Aug. 2, 1927.

W. C. BRANDENBURG 1,637,852

RECORDING INSTRUMENT

Filed Sept. 8, 1924

3 Sheets-Sheet 1

Inventor:
Wilson C. Brandenburg,
by
His Attorney.

Aug. 2, 1927.  W. C. BRANDENBURG  1,637,852
RECORDING INSTRUMENT
Filed Sept. 8, 1924   3 Sheets-Sheet 2
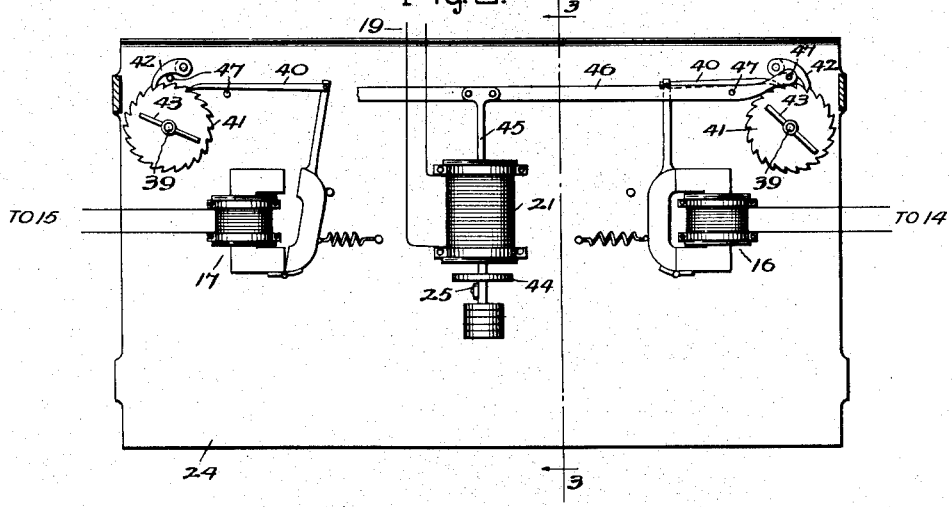
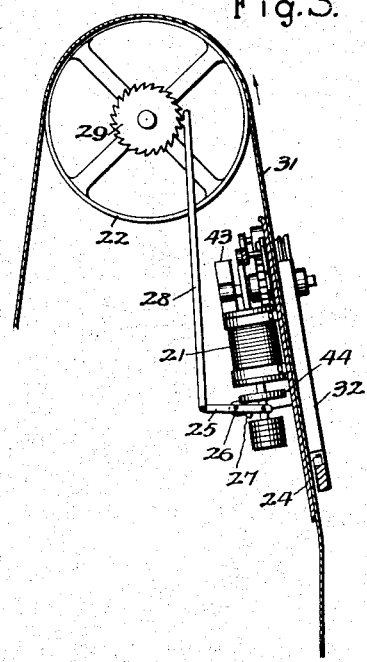
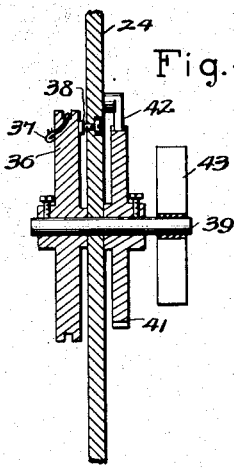
Inventor:
Wilson C. Brandenburg,
by
His Attorney.

Aug. 2, 1927.
W. C. BRANDENBURG
1,637,852
RECORDING INSTRUMENT
Filed Sept. 8, 1924
3 Sheets-Sheet 3
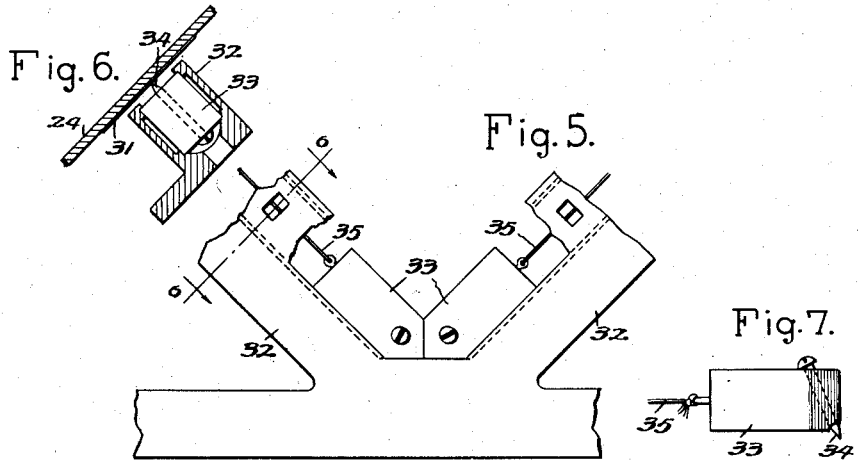
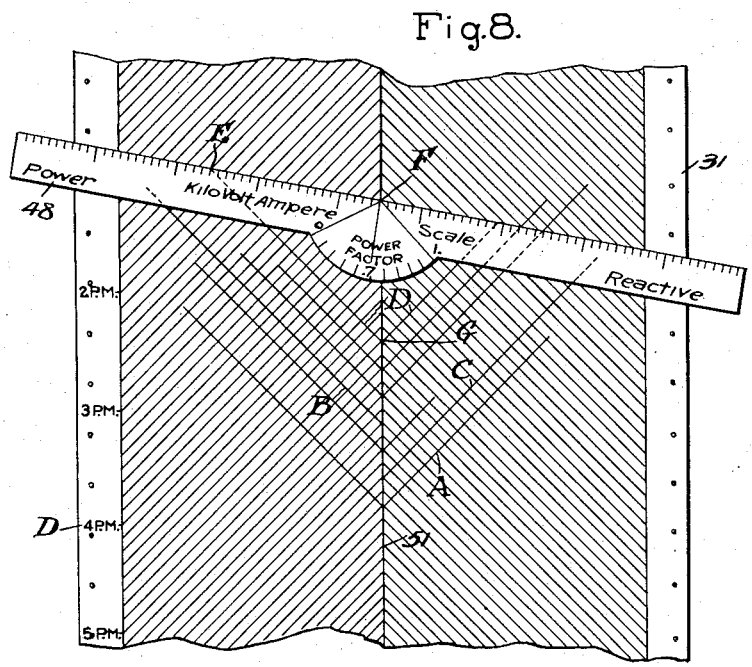
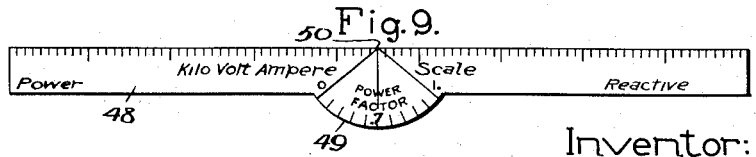
Inventor:
Wilson C. Brandenburg,
by
His Attorney.

Patented Aug. 2, 1927.

1,637,852

UNITED STATES PATENT OFFICE.

WILSON C. BRANDENBURG, OF WESTON, WEST VIRGINIA, ASSIGNOR TO GENERAL ELECTRIC COMPANY, A CORPORATION OF NEW YORK.

RECORDING INSTRUMENT.

Application filed September 8, 1924. Serial No. 736,404.

My invention relates to recording instruments and in particular to an instrument for recording the maximum demands of kilowatt hours and reactive component hours of an alternating current circuit in such a way that the maximum demand in kilo-volt ampere hours and the power factor occurring at this demand may be readily ascertained from the record.

It has heretofore been proposed to measure the maximum demand of kilowatt hours and of reactive component hours of an alternating current circuit over the same time interval and obtain the maximum demand in kilo-volt ampere hours by vectorially adding the two first mentioned quantities. My invention relates to certain improvements in the recording mechanism by means of which such quantities are recorded in their true vector relation to the end that the number of records obtainable on a given length of record sheet may be greatly increased and further, to facilitate obtaining the corresponding kilo-volt ampere demand and the average power factor existing over the demand interval.

In carrying my invention into effect, I provide recording apparatus designed to draw lines at right angles to each other proportional to the watt and reactive component demands respectively over successive time intervals. These lines are started from a common point on a central line of a chart and are drawn at an angle of 45° thereto. At the end of each time interval, the recording devices are released and move by gravity to the central position on the chart. Then the chart is moved along a short distance and preferably remains stationary throughout the next time interval. In this way a series of V's are drawn one inside of the other, the arms of the V's being respectively equal to the watt and wattless component over equal time intervals. By means of a simple scale, the distance between the extremities of the arms may be measured in terms of volt ampere demand. The scale is preferably provided with a sector graduated in power factor arranged so that the angular position of the scale with respect to the central reference line of the chart when the volt ampere measurement is made indicates the average power factor over the demand interval. The chart is preferably graduated by reference lines at right angles to the records so that the kilowatt hour demand and the reactive component hour demand may be readily ascertained by inspection.

The features of my invention which are believed to be novel and patentable will be pointed out in the claims appended hereto. For a better understanding of my invention, reference is made in the following description to the accompanying drawing in which Fig. 1 shows a diagrammatic representation of my invention; Fig. 2 shows the mechanism for actuating the recording devices, said devices being represented as mounted on the back of the plate over which the record sheet is moved; Fig. 3 shows a section taken on line 3—3 of Fig. 2 to illustrate how the relay 21 advances the record sheet at the end of each time interval; Fig. 4 shows a cross-section through one of the rotatable actuators; Figs. 5, 6, and 7 show the details of the recorders and the guides in which they move; and Fig. 8 shows a section of a record sheet used with my recorder and illustrates the use of the scale represented in Fig. 9 for measuring the volt ampere demand and the corresponding power factor.

Referring now to Fig. 1, 10 represents a watthour meter and 11 a wattless component hour meter. These meters will be connected to the same circuit 13 so as to measure the watt and the wattless components of the energy flowing therein and obviously may be single phase or polyphase meters. These meters are arranged to operate ordinary contacting devices 14 and 15 so as to send current impulses from a source of supply 9 to the actuating devices of the recorder at rates proportional to the respective speeds of the meters. The energizing coils of the actuating devices are indicated in dotted lines at 16 and 17 and the details are shown in Fig. 2. Some kind of a timing device represented at 18 is provided to close an energizing circuit 19 at predetermined intervals, for example, every 15 minutes. This energizing circuit leads to a relay 21 for advancing the record sheet at the end of each time interval and for releasing the recording devices.

The record sheet 31 is arranged to be advanced by a drum 22 from a supply roll 23 over a suitable plate 24. The armature of relay 21 (see Fig. 3) is connected to a lever 25 which is pivoted at 26 and the lever normally rests against a stop 27. Its free end carries a ratchet 28 which cooperates with a ratchet wheel 29 on the shaft of drum 22. The drum is made in two sections between which ratchet 28 passes. When the timing device 18 closes the circuit 19, the right hand end of lever 25 is raised and in so doing, the pawl 28 slips down over a tooth in the ratchet wheel 29. A second pawl 30 and ratchet wheel 29' is provided at the end of the drum as shown in Fig. 1 to prevent the backward rotation of drum 22 when pawl 28 is lowered. Now, when the circuit 19 is deenergized by the opening of the time controlled contact, the left hand end of lever 25 is raised and in so doing, rotates the drum and advances the chart a short distance in the direction of the arrow. The clock mechanism which is represented at 18 will of course be arranged to close and open the circuit 19 promptly. The circuit should not remain closed more than a few seconds. Other arrangements for advancing the chart will occur to those skilled in the art, and if desired the chart may be advanced continuously at a uniform rate.

The front of plate 24 over which the chart 31 is advanced is provided with suitable guides 32 forming a V with the bottom of the V coming over a reference line 51 near the center of the chart. The guides form an angle of 90° to each other and 45° to the reference line 51. In or on these guides which are just out of contact with the chart are provided sliding weights 33 and these weights are provided with styli or markers 34 close to their inner ends as more clearly shown in Figs. 5, 6 and 7. These markers are adjusted to contact with the record sheet so as to leave a mark thereon when the weights are moved in their guides, as shown in Fig. 6, this representing a section taken on line 6—6 of Fig. 5. As clearly shown in Fig. 1, the guides 32 are inclined at an angle of 45° from a vertical position and the chart is inclined slightly away from a vertical position. The purpose of this arrangement is to permit the weights 33 to descend in the guides by gravity and allow the marker 34 to rest lightly against the record sheet at all times. The weights 33 are sufficiently loose in their guides to permit this.

The means for moving the recording weights up their guides will now be described. The upper end of each weight is, in this instance, secured to a cord 35 and the cords pass up through the guides to pulleys 36 to which they are secured, as represented at 37 in Fig. 4. These pulleys are preferably of sufficient diameter as not to require more than a complete revolution to wind up the cords 35 and raise the weights 33 from the lowest position at the center of the record sheet to their highest position adjacent the edges of the record sheet. Stops are provided for the pulleys, as shown at 38 so as to stop the pulleys and keep the cords taut when the weights reach the bottom of their respective guides. The pulleys 36 are carried on the front of the plate 24 at the sides of the record sheet and are connected to shafts 39 which pass through the plates and have a bearing therein. Carried on the rear side of the plate are the actuating devices for the pulleys and consist of the ratcheting relays 16 and 17 previously referred to, ratcheting pawls 40 and ratchet wheels 41, the latter being secured to the shafts 39. Stop pawls 42 are provided to prevent backward rotation of the pulleys when the relays 17 and 18 are normally deenergized. Preferably, fans 43 are provided on shafts 39 to prevent the weights from gaining destructive momentum when they are released. The relay 17 is shown deenergized and the relay 16 energized in Fig. 2 with the corresponding positions of their respective armatures and ratcheting pawls. The relay 21, in addition to advancing the record sheet, is arranged to lift the pawls and ratchets at the end of a time interval in order to allow the recording devices to return to a zero position at the central reference line of the chart. This relay is provided with an armature 44 which is pulled up by relay 21 as soon as the time controlled contact is closed to energize circuit 19. The armature is secured to a non-magnetic bar 45 which passes up through the relay coil. The bar 45 is secured to a cross-bar 46 which extends in both directions adjacent the pawls 42 and the ratchets 40. This cross-bar carries four pins 47 which pass under the various pawls and ratchets and are just out of contact therewith when the relay 21 is deenergized. When the relay 21 is energized, these pins are raised by the cross-bar and move the pawls 42 and the ratchets 40 away from ratchet wheels 41 and release them. As soon as the circuit 19 is deenergized, the pawls and ratchets are allowed to drop back against their respective ratchet wheels. It will be noted that while the recording devices are released when circuit 19 is energized, the chart is not advanced by lever 25 until this circuit is deenergized. The brief interval during which the circuit 19 is energized permits the recording devices to return to a zero position before the chart is advanced; consequently, the markers 34 will trace the same lines on the chart in ascending and descending during one time interval. If the chart is arranged to be advanced at a uniform rate, the return of the styli to a zero position will produce the records in their true vector relation.

The operation of the apparatus may be reviewed as follows: At the beginning of a time interval, the timing device will have just deenergized circuit 19 which will release lever 25 and allow it to drop against stop 27 and advance the chart a short distance, for example, $\frac{1}{32}$ of an inch, although this distance may be made greater if desired. The weights 33 will be at the bottom of their guides with their respective markers 34 almost touching on the central reference line of the chart. The stops 38 on pulleys 36 will be against the stationary cooperating stops in plate 24 and the cords will be adjusted so there is no slack therein. Now, as meter 10 rotates, it will actuate the contacting device 14. This will energize and deenergize relay 16, causing its armature to move the ratchet pawl 40 forward and back to rotate ratchet wheel 41 and pulley 36. The same thing will happen with meter 11 if there is any reactive component in the circuit being metered. As a result, the weights 33 will be pulled up their respective guides and the markers will draw lines at right angles to each other. At the end of a time interval, these lines will have lengths proportional to the power and reactive components respectively and will represent the demands of these components over the time interval. The timing device now closes circuit 19 energizing relay 21, relay 21 immediately releases the ratchet wheels 41 and the weights will descend by gravity, rotating their pulleys and ratchet wheels in the opposite direction. Fans 43 prevent the gravity operated parts from gaining destructive momentum and the parts come to rest in the zero position. By this time the time controlled circuit 19 will be deenergized and armature lever 25 will move to advance the record sheet.

The type of record obtained is represented in Fig. 8. The record at A shows that the demands of power and reactive component were about equal during that interval. At B the record shows only power component and at C only reactive component. The chart is preferably provided with evenly spaced graduations running at right angles to the record lines and these graduations serve for two purposes; first, as time graduations, the time being preferably stamped in the margin as shown, and second, as kilowatt hour and reactive component hour graduations. Thus, if the distance between the adjacent graduated lines which run at right angles to the record lines represents 10 such hours, we immediately see that for the interval ending at 4:45 p. m. the record at D shows the kilowatt hour demand was 240 and the kiloreactive component hour demand was 165. By calculation, the kilovolt ampere hour demand is $$\sqrt{(240)^2+(165)^2}$$

However, by means of the transparent scale 48 calibrated in kilovolt ampere units, we can immediately measure the distance between the extremities of the two records as illustrated, and obtain the kilovolt ampere demand without calculation. This scale may also be used to measure the other components in case the graduation lines are left off the chart.

As more clearly shown in Fig. 9, the scale is provided with a sector 49 having its center at 50 on the upper edge of the scale. 90 degrees of this sector is calibrated in terms of power factor and this 90° sector has its edges lying 45° from the upper edge of the scale. Referring to Fig. 8 angle GEF which will be designated $\phi$ is the average angle existing between the volts and amperes of the circuit during the time interval represented by the records D.

$$\phi=180°-(EFG+EGF)$$
$$EFG=45°+OFG \text{ and}$$
$$EGF=45°.$$

Substituting these values in the above equation, we get $\phi=90°-OFG$ which is the angle between the right hand edge of the graduated sector of scale 48 and reference line 51. Consequently, if we place this scale as represented in Fig. 8, with its upper edge connecting the extremities of the two records and with point 50 on the reference line of the chart, the angle $\phi$ which this line makes with the right hand edge of the sector is the average angle existing between the current and voltage of the circuit being metered during the time interval; that is $\cos \phi = $ the average power factor during the interval. Consequently, the sector may be graduated directly in terms of power factor and the kilovolt ampere hour demand and the average power factor over the time interval during which the demand was measured may be read off directly without calculation. Thus, if we place the scale with its upper edge on record B, which represents both the kilowatt hour and the kilovolt ampere hour demand for that interval, with point 50 on reference line 51, the angle $\phi$ will be zero and the indicated power factor unity, i. e., $\cos 0=1$. As it will appear to those skilled in the art, the invention may be utilized to record other related vector quantities than those represented and, consequently, I do not wish to limit my claims to the recording of watt and wattless component vectors.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:—

1. Apparatus for recording related vector quantities of an alternating current circuit comprising two meters connected in said circuit so as to measure different related vector quantities thereof, a record sheet, a pair of recording styli cooperating with said record sheet, means responsive to the measurements of said meters for respectively moving said styli proportional to the respective measurements and guiding means for said styli whereby vector records of said measurements are produced in their true vector relation.

2. Apparatus for recording related vector quantities of an alternating current circuit comprising watt and wattless component meters of the integrating type, a record sheet, a recording stylus for each meter cooperating with said record sheet, means responsive to the respective rates of said meters for respectively moving said styli at corresponding rates, means for guiding said styli at right angles to each other, means for resetting said styli to a common point at predetermined intervals and means for advancing said record sheet.

3. Apparatus for recording vector quantities of an alternating current circuit comprising two integrating type meters connected in said circuit so as to measure different related vector quantities thereof, a record sheet, a pair of recording styli cooperating with said record sheet, means responsive to the measurements of said meters for respectively moving said styli at rates proportional to the respective measurements of said meters, means for guiding said styli whereby records of the measurements are produced in their true vector relation to each other, means for resetting said styli to a common reference point at predetermined intervals and means for advancing said record sheet at the end of each such interval.

4. Recording apparatus comprising a record sheet, time controlled means for advancing said record sheet in a given direction, a pair of recording styli arranged to be moved at right angles to each other from a reference point near the center of said record sheet and at angles of 45 degrees from the direction of movement of said sheet, a wattless component hour meter, means responsive to said meter for moving one of said styli, a watthour meter, means responsive to said watthour meter for moving the other of said styli, and means for causing said styli to be moved back to the reference point at predetermined intervals.

5. Apparatus for recording related vector quantities of an alternating current circuit comprising two meters of the integrating type connected in said circuit so as to measure different related vector quantities thereof, a record sheet, having a central reference line, recording styli for each of said meters cooperating with said record sheet and having a common zero position on said reference line, means responsive to the rates of the respective meters for respectively moving said styli at corresponding rates, guiding means for said styli whereby they are moved in directions representative of the related vector directions of the metered quantities, means for resetting said styli to the zero position at predetermined intervals, and means for advancing said record sheet in the direction of the reference line.

6. In a maximum demand watt and wattless component recording meter, a record sheet therefor having a central reference line and watt and wattless component graduation lines drawn at right angles to each other and at 45 degrees to said reference line, and recording apparatus responsive to the watt and wattless components of an alternating current circuit over predetermined time intervals for producing vector records of said components on said record sheet which vectors are drawn at right angles to the corresponding graduation lines and intersect at the reference line.

7. A chart for a recording meter, vector records on said chart representative of the watt and wattless components of an alternating current circuit, a reference line on said chart intersecting the intersecting point of said records at a predetermined angle, and a scale for said chart having volt ampere graduations in the same units to which the vector records are drawn, and a power factor scale drawn on the arc of a circle and graduated so that when the scale is placed on said chart to scale off the volt ampere demand with the center of said circle on the reference line of the chart, the power factor corresponding to the vector records is indicated directly.

8. A record sheet having intersecting vector records representative of related vector quantites of an alternating current circuit, the outer extremities of the intersecting vectors determining a third related vector of said circuit, a scale for said chart graduated in the units to which the vectors are drawn and power factor graduations on said scale by means of which the power factor corresponding to the vector quantities may be ascertained by inspection when the scale is placed on the chart to measure one of the vector quantities.

9. Recording apparatus comprising a record sheet, a pair of styli cooperating with said record sheet, means for guiding said styli at a definite angle to each other over said record sheet, meter responsive means for respectively moving said styli in their respective recording directions and time controlled, gravity operated means for simultaneously returning said styli to zero positions.

10. Recording apparatus comprising a record sheet, a reference line on said record sheet, means for moving said record sheet in the direction of the reference line, a plurality of styli cooperating with said record sheet, said styli having a zero recording position on said reference line, meter responsive means for individually moving said styli to recording positions, means for guiding said styli in different directions from the zero recording position and means for simultaneously returning said syli to said zero position.

In witness whereof, I have hereunto set my hand this 29 day of August, 1924.

WILSON C. BRANDENBURG.